(12) United States Patent
Wee et al.

(10) Patent No.: US 11,797,070 B2
(45) Date of Patent: Oct. 24, 2023

(54) RESPONSE MECHANISMS FOR POWER-INTERRUPTION EVENTS IN POE SYSTEMS

(71) Applicant: HEWLETT PACKARD ENTERPRISE DEVELOPMENT LP, Houston, TX (US)

(72) Inventors: Hong Yi Wee, Singapore (SG); Kah Hoe Ng, Johor (MY); Shiyu Tian, Singapore (SG)

(73) Assignee: Hewlett Packard Enterprise Development LP, Spring, TX (US)

( * ) Notice: Subject to any disclaimer, the term of this patent is extended or adjusted under 35 U.S.C. 154(b) by 231 days.

(21) Appl. No.: 16/925,928

(22) Filed: Jul. 10, 2020

(65) Prior Publication Data

US 2022/0011841 A1 Jan. 13, 2022

(51) Int. Cl.
*G06F 1/3296* (2019.01)
*G06F 1/30* (2006.01)
*G06F 1/28* (2006.01)

(52) U.S. Cl.
CPC .................. *G06F 1/30* (2013.01); *G06F 1/28* (2013.01); *G06F 1/3296* (2013.01)

(58) Field of Classification Search
None
See application file for complete search history.

(56) References Cited

U.S. PATENT DOCUMENTS

| | | | |
|---|---|---|---|
| 4,445,167 A * | 4/1984 | Okado | H02M 7/53875 318/811 |
| 5,936,318 A * | 8/1999 | Weiler | H02J 9/00 307/66 |
| 7,886,165 B2 | 2/2011 | Khan et al. | |
| 8,732,501 B1 | 5/2014 | Ghose et al. | |
| 2009/0217088 A1 | 8/2009 | Diab | |
| 2012/0331322 A1* | 12/2012 | Suzuki | G03G 15/5004 713/323 |
| 2013/0339760 A1* | 12/2013 | Zimmerman | G06F 1/26 713/300 |
| 2014/0195831 A1* | 7/2014 | Hamdi | G06F 1/325 713/320 |
| 2017/0199794 A1 | 7/2017 | Byers et al. | |
| 2017/0220101 A1 | 8/2017 | Brooks et al. | |

* cited by examiner

*Primary Examiner* — Paul Yen
(74) *Attorney, Agent, or Firm* — Hewlett Packard Enterprise Patent Department

(57) ABSTRACT

Systems and methods disclosed herein allow efficient reallocation of PoE when a PSU for a PSE fails. A PSE initially receives power from at least two PSUs and provides PoE to at least two PDs. When power from one of the PSUs becomes unavailable, the PSE refrains from providing PoE to a first PD, but continues providing PoE to a second PD. The PSE sends a communication to the second PD requesting that the second PD allow the PSE to allocate less power to the second. If the second PD confirms that allocating less power to the second PD is acceptable, the PSE reduces the amount of power allocated to the second PD and allocates at least some of the power saved by the reduction to the first PD.

20 Claims, 5 Drawing Sheets

RESPONSE MECHANISMS FOR POWER-INTERRUPTION EVENTS IN POE SYSTEMS

BACKGROUND

Power over Ethernet (PoE) allows an Ethernet cable to be used for both power transmission and data transmission. Devices such as Voice over Internet Protocol (VoIP) phones, Light-Emitting Diode (LED) lights, Internet Protocol (IP) cameras, wireless access points (APs), and Bluetooth Low-Energy (BLE) beacons can be powered by PoE and can therefore be installed in locations where it would be impractical or expensive to install conventional wires used to provide power.

A number of industry standards exist for PoE devices. For example, the Institute of Electrical and Electronics Engineers (IEEE) has defined at least three industry standards: IEEE 802.3af, which allows up to 15.4 Watts to be delivered over Category 5 (Cat5) Ethernet cables; IEEE 802.3at, which allows up to 30 Watts to be delivered over Cat5 cables; and IEEE 802.3bt, which allows up to 71.3 Watts to be delivered over Cat5 cables. LTPoE++, a proprietary standard, allows up to 90 Watts to be delivered over Cat5 cables. In the IEEE standards, a device that receives PoE is called a Powered Device (PD), while a device that provides PoE is called a Power Sourcing Equipment (PSE).

BRIEF DESCRIPTION OF THE DRAWINGS

Various features and advantages will become apparent from the following description, given by way of example only, which is made with reference to the accompanying drawings, of which.

DETAILED DESCRIPTION

Enterprise networks, data center networks (DCNs), and other types of computing networks are used to support a wide variety of industries. Increasingly, many of these networks provide not only a conduit for electronic communications, but also for power to powered devices (PD) via Ethernet. Lapses in PoE for certain types of PDs may prove costly for such institutions. Therefore, businesses, universities, governments, hospitals, and other institutions that use such networks often value reliability highly.

To facilitate increased reliability, more network switches and chassis are being configured to receive power from multiple power supply units (PSUs) at a time. This redundancy can prevent network switches from shutting down entirely when a single PSU fails, thus preventing a time consuming reboot. However, when a redundant PSU providing power to a switch fails, the switch may be obliged to stop providing power over Ethernet to a subset of the PDs that are connected to the switch in order to conserve power. Some ports on the switch that are designated as high priority may continue providing power to the PDs connected thereto in the event of a PSU fault, but ports with lower priority designations may be obliged to stop providing PoE as a result of the PSU fault. PDs that are connected to the lower-priority ports may have to wait until a failed PSU is repaired or replaced to receive PoE again. PDs that are backed up by batteries may be able to postpone shutting down for a time, but may ultimately be obliged to shut down if PoE does not become available again in a short period of time. If such PDs do shut down, the reboot process may cause a further delay after the fault with the PSU is resolved.

Systems and methods described herein provide a way for PSEs (e.g., switches) to resume providing at least some PoE to PDs that are connected to lower-priority ports after an event (e.g., a fault) interrupts the power flow from a PSU before the event is fully resolved. As described in further detail below, a PSE can communicate that a PSU interruption event has occurred to the high-priority PDs that are still receiving power (e.g., due to being connected to high-priority ports) and negotiate with the high-priority PDs to re-allocate some power that is currently allocated to, but is not being used by, the high-priority PDs to the lower-priority PDs.

Figure 1:
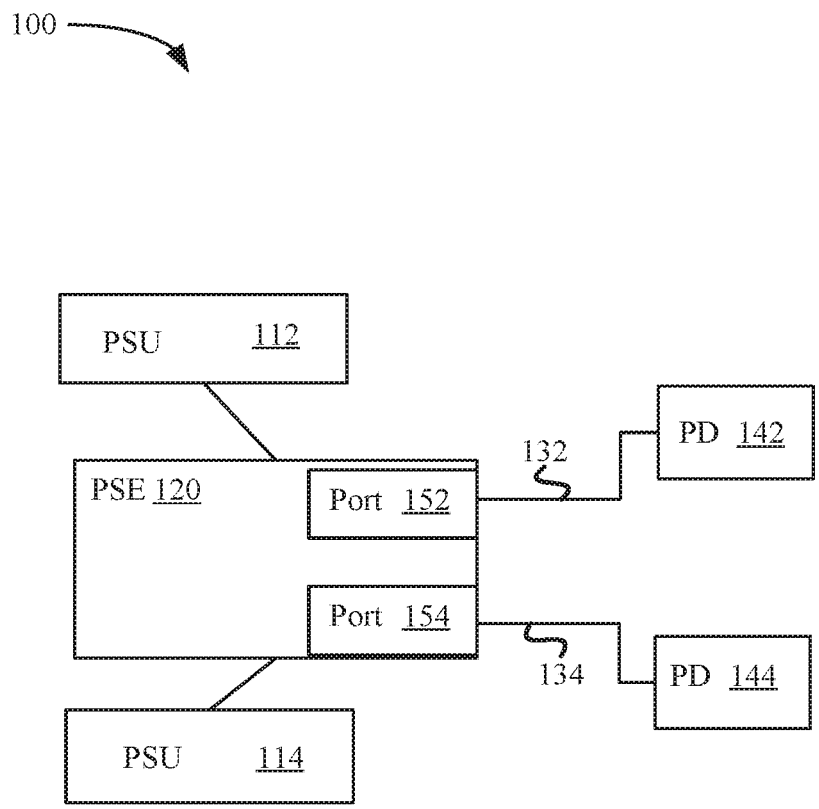
FIG. 1 illustrates an example computing environment in which systems described herein can operate.

FIG. 1 illustrates an example computing environment 100 in which systems described herein can operate. As shown, the computing environment 100 includes a power sourcing equipment (PSE) 120 (e.g., a switch, a multi-slot chassis containing multiple switches, or a router). The power supply unit (PSU) 112 and PSU 114 both supply power to the PSE 120.

When the powered device (PD) 142 is initially connected to the PSE 120 by the Ethernet cable 132, the PD 142 and the PSE 120 may exchange a series of communications that conform to the Link Layer Discovery Protocol (LLDP). The LLDP is a vendor-neutral link layer protocol used by network devices to communicate information such as device identities, device capabilities, port names and descriptions, medium access control (MAC) and physical (PHY) layer information, and medium dependent interface (MDI) information.

Through this series of LLDP communications, the PD 142 requests that the PSE 120 supply power over Ethernet to the PD 142. The PSE 120 may elect to comply with the request or reject the request. If the PSE 120 complies, the PSE 120 allocates an amount of power to the PD 142 (e.g., up to 90 Watts to if the Ethernet cable 132 is a Cat5 cable) and provides the allocated amount of power to the PD 142 via the port 152 and the Ethernet cable 132.

The PD 144 also requests that the PSE 120 supply power over Ethernet to the PD 144 in a similar fashion. If the PSE 120 complies with the request received from the PD 144, the PSE 120 allocates an amount of power to the PD 142 and provides the amount of power allocated to the PD 144 via the port 154 and the Ethernet cable 134.

The PD 142 and the PD 144 may be any type of device that can receive PoE, such as (but not limited to) Voice over Internet Protocol (VoIP) phones, Light-Emitting Diode (LED) lights, Internet Protocol (IP) cameras, wireless access points (APs), and Bluetooth Low-Energy (BLE) beacons. Persons of skill in the art will also understand that the PSE 120, the PD 142, and the PD 144 may each comprise a processor and memory to facilitate execution of the functionality described herein.

Within the PSE 120, port 152 and port 154 may each be assigned a priority value (e.g., a Spanning Tree Port Priority value). In one example, suppose the PSU 112 unexpectedly ceases to function properly (e.g., due to a hardware failure, overheating, a failure of an electrical outlet into which the PSU 112 in plugged, etc.) while the PSE 120 is providing PoE to both the PD 142 and the PD 144. The amount of power flowing into the PSE 120 is reduced by the failure of the PSU 112. As a result, the amount of power that the PSE 120 is able to provide via Ethernet may also be reduced.

In response to the failure of the PSU 112, a rapid power-down (RPD) signal or a multi-priority rapid power-down (MPRPD) signal may be triggered within the PSE 120. In one example, suppose that the amount of power that the PSU 114 provides to the PSE 120 after the failure of the PSU 112 is sufficient for the PSE 120 to continue providing the amount of power allocated to the PD 142 or the amount of power allocated to the PD 144, but not both. Also suppose the port 152 is assigned a higher priority value than is assigned to the port 154. In this example, the PSE 120 may react to the RPD or MPRPD signal by ceasing to provide power to the PD 144 via the port 154 to ensure that the flow of power to the PD 142 is not disrupted by the malfunctioning of the PSU 112.

In this example, also suppose that the amount of power allocated to the PD 142 exceeds the amount of power that the PD 142 is actually consuming. If the difference between that power that the PD 142 is actually consuming and the amount of power allocated to the PD 142 is greater than or equal to the amount of power that the PD 144 would actually consume (e.g., in a normal operating mode or in a low-power operating mode), then the PSE 120 could potentially power both the PD 142 and the PD 144 despite the failure of the PSU 112. However, in the current LLDP protocol, a PD simply requests power from a PSE and the PSE can choose to comply by providing the requested amount of power or not. The current LLDP protocol provides no way for a PSE to request that a PD accept a lower power allocation in response to a PSU failure after the initial allocation of power to that PD has been completed. Thus, under the constraints of existing systems, there would be no way for the PSE 120 to request that the PD 142 accept a lower amount of power allocation in response to the failure of the PSU 112 so that the PSE 120 could reallocate some of the power currently allocated to the PD 142 to the PD 144. As a result, the potential capacity to keep powering the PD 144 after the failure of the PSU 112 would be wasted.

However, as described in greater detail below, in response to the fault of the PSU 112, the PSE 120 can request that the PD 142 accept a lower amount of power than was initially allocated to the PD 142. If the PD 142 elects to comply with the request, the PSE 120 can reduce the amount of power allocated to the PD 142 and reallocate at least some of the difference to the PD 144. Once the reallocation is complete, the PSE 120 resumes providing power to PD 144 via the port 154 and the Ethernet cable 134 despite the failure of the PSU 112. In this manner, the PSE 120 is able to re-negotiate the amount of power allocated to the PD 142 so that both the PD 142 and the PD 144 can be powered after the failure of the PSU 112.

To facilitate this re-negotiation of the amount of power allocated to the PD 142, an additional Type-Length-Value (TLV) that can be added to the LLDP protocol. The additional TLV can include at least one bit that serves as a PSU fault status. A first value of the bit (e.g., zero) may indicate that no PSU fault has occurred in any of the PSUs that is supplying power to the PSE 120, while a second value of the bit (e.g., one) may indicate that a PSU fault has occurred in at least one of the PSUs (e.g., PSU 114) that is supplying power to the PSE 120. The additional TLV may also include one or more bits that indicate whether the PD 142 is willing to switch to a power-saving mode. Furthermore, the additional TLV may include a plurality of bits that indicate how much power the PD 142 has to receive in order to operate in the power-saving mode. Also, the TLV may include a plurality of bits that indicate an amount of power that the PD 142 is expected to consume (e.g., on average) while operating in the normal mode.

The additional TLV allows the PSE 120 to have multiple options while negotiating with the PD 142 to reduce the amount of power initially allocated to the PD 142. For example, if the PD 142 is willing to switch to the power-saving mode, the PSE 120 can reduce the amount of power allocated to the PD 142 to the amount that the additional TLV indicates the PD 142 has to receive in order to operate in the power-saving mode. Once the PSE 120 updates the amount of power allocated to the PD 142, the PSE 120 can allocate some or all of the difference between the initial amount of power allocated to the PD 142 and the reduced amount of power allocated to the PD 142 to the PD 144.

On the other hand, if the PD 142 is unwilling to switch into the power-saving mode, the PSE 120 can reduce the amount of power allocated to the PD 142 to the amount that the PD 142 is expected to consume plus a predefined margin amount. Once the PSE 120 updates the amount of power allocated to the PD 142, the PSE 120 can allocate some or all of the difference between the initial amount of power allocated to the PD 142 and the reduced amount of power allocated to the PD 142 (e.g., the initial amount minus the sum of the expected amount and the predefined margin amount) to the PD 144.

While the PSE 120, the PD 142, the PD 144, the Ethernet cable 132, the Ethernet cable 134, the port 152, the port 154, the PSU 112, and the PSU 114 are provided for illustrative purposes, persons of skill in the art will understand that no limitation on the number of PSEs, PDs, Ethernet cables, ports, or PSUs is intended thereby. Furthermore, the number of PSUs connected to a single PSE, the number of PDs connected to a single PSE, the number of PSEs connected to a single PD, and the number of Ethernet cables used to connect a PSE to a PD may all vary. For example, a single PD may be connected to a single PSE or multiple PSEs via more than one Ethernet cable (e.g., to receive more power via Ethernet than can be provided through a single port). Also, in some examples, PSEs and PDs may not necessarily be mutually exclusive. A PoE pass-through switch, for example, may concurrently act as both a PD (by receiving power through one Ethernet port) and a PSE (by providing power to another PD through another Ethernet port). In the case of a PoE pass-through switch, the PSEs that provide power to the PoE pass-through switch may serve the same role as the PSUs described herein.

Figure 2:
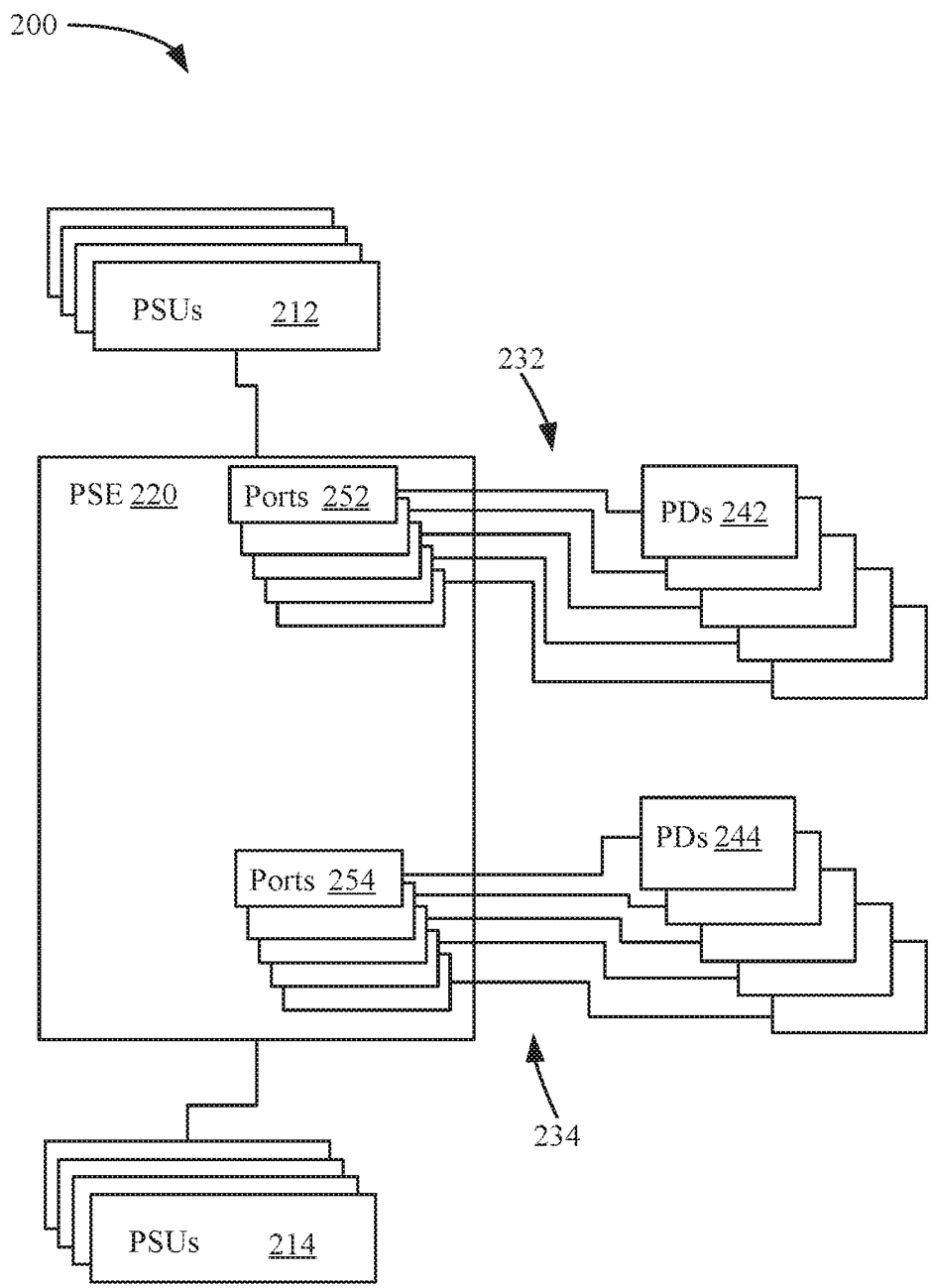
FIG. 2 illustrates an additional example computing environment in which systems described herein can operate.

FIG. 2 illustrates an additional example computing environment in which systems described herein can operate. FIG. 2 is provided to further elucidate how some of the principles described with respect to FIG. 1 can be generalized to a scenario that includes more than two PDs and more than two PSUs.

As shown, the computing environment 200 includes a power sourcing equipment PSE 220 (e.g., a switch, a multi-slot chassis containing multiple switches, or a router). The PSUs 212 and the PSUs 214 supply power to the PSE 220.

When the PDs 242 and the PDs 244 are initially connected to the PSE 220 by the Ethernet cables 232 and the Ethernet cables 234, respectively, each of the PDs 242 and the PDs 244 may exchange a series of communications that conform to LLDP with the PSE 220. Through this series of LLDP communications, each of the PDs 242 and the PDs 244 requests PoE from the PSE 220. The PSE 220 may elect to comply with or reject each request individually. If the PSE 220 complies with each request, the PSE 220 allocates an amount of power to the each of the PDs 242 and the PDs 244, respectively, in accordance with the amount of power indicated by each request and provides the allocated amount of power to the PDs 242 and the PDs 244 (via the ports 252 and the Ethernet cables 232 or via the ports 254 and the Ethernet cables 234, respectively).

Within the PSE 220, each of the ports 252 and the ports 254 may be assigned a priority value (e.g., a Spanning Tree Port Priority value). In one example, suppose the PSUs 212 unexpectedly cease to function properly while the PSE 220 is providing PoE to the PDs 242 and the PDs 244. The amount of power flowing into the PSE 220 is reduced by the failure of the PSUs 212. As a result, the amount of power that the PSE 220 is able to provide via Ethernet may also be reduced.

In response to the failures of the PSUs 212, an RPD signal or an MPRPD signal may be triggered within the PSE 220. In one example, suppose that the amount of power that the PSU 214 provides to the PSE 220 after the failure of the PSU 212 is not sufficient for the PSE 220 to continue providing PoE to the entire set of PDs that comprises the PDs 242 and the PDs 244, but is sufficient to continue providing PoE to a subset thereof. Also suppose the ports 252 are assigned higher priority values than are assigned to the ports 254. In this example, the PSE 220 may react to the RPD or MPRPD signal by ceasing to provide power to the PDs 244 via the ports 254 while continuing to provide power to the PDs 242 via the ports 252.

In this example, also suppose that the sum of the amounts of power allocated to the PDs 242 exceeds sum of the amounts of power that the PDs 242 are actually consuming. If the difference between the sum of the amounts of power that the PDs 242 are actually consuming and the sum of the amounts of power allocated to the PDs 242 is greater than or equal to the sum of the amounts of power that the PDs 244 would actually consume (e.g., in a normal operating mode or in a low-power operating mode), then the PSE 220 could potentially power both the PDs 242 and the PDs 244 despite the failure of the PSUs 212.

In response to the failures of the PSUs 212, the PSE 220 can request that the some of the PDs 242 accept lower amounts of power than were initially allocated thereto. If those of the PDs 242 that receive such a request elect to comply therewith, the PSE 220 can reduce the amounts of power allocated to those of the PDs 242 that elect to comply and reallocate at least some of the difference to the PDs 244. Once the reallocation is complete, the PSE 220 resumes providing power to at least some of the PDs 244 via the ports 254 and the Ethernet cables 234 despite the failure of the PSUs 212. In this manner, the PSE 220 is able to re-negotiate the amounts of power allocated to the PDs 242 so that both the PDs 242 and at least some of the PDs 244 can be powered after the failure of the PSUs 212.

Specifically, PSE 220 can use communications that include the additional TLV described above with respect to FIG. 1 to re-negotiate the amounts of power that were initially allocated to the PDs 242. If at least some of the PDs 242 are willing to switch to the power-saving mode, the PSE 220 can reduce the amounts of power allocated to those of the PDs 242 to the amounts that the PDs 242 have to receive in order to operate in the power-saving mode. Once the PSE 220 updates the amounts of power allocated to those of the PDs 242 that accept the request to go into the power-saving mode, the PSE 220 can allocate some or all of the difference between the sum of the initial amounts of power allocated to the PDs 242 and the sum of the updated amounts of power allocated to the PDs 242 to the PDs 244. If this difference is sufficient to power the PDs 244 (e.g., in at least a power-saving mode), the PSE 220 may determine that further re-negotiation would be superfluous.

However, if the difference is insufficient for the PSE 220 to provide PoE to power some of the PDs 244, the PSE 220 can continue re-negotiating with one or more of the PDs 242 that are unwilling to switch into the power-saving mode. Specifically, the PSE 220 can reduce the amount of power allocated to an individual PD of the PDs 242 that is unwilling to go into the power-saving mode to an amount that the individual PD is expected to consume (e.g., as indicated by the additional TLV) plus a predefined margin amount. Once the PSE 220 updates the amount of power allocated to the individual PD, the PSE 220 can allocate some or all of the difference between the initial amount of power allocated to the individual PD and the reduced amount of power allocated to the individual PD (e.g., the initial amount minus the sum of the expected amount and the predefined margin amount) to the PDs 244. If there is still insufficient power for at least one of the PDs 244, the PSE 220 can reduce the amount of power allocated to additional individual PDs of the PDs 242 that are unwilling to go into the power-saving mode until sufficient power is available for the PSE 220 to provide PoE to the PDs 244 such that each of the PDs 244 can operate in at least a power-saving mode.

Figure 3:
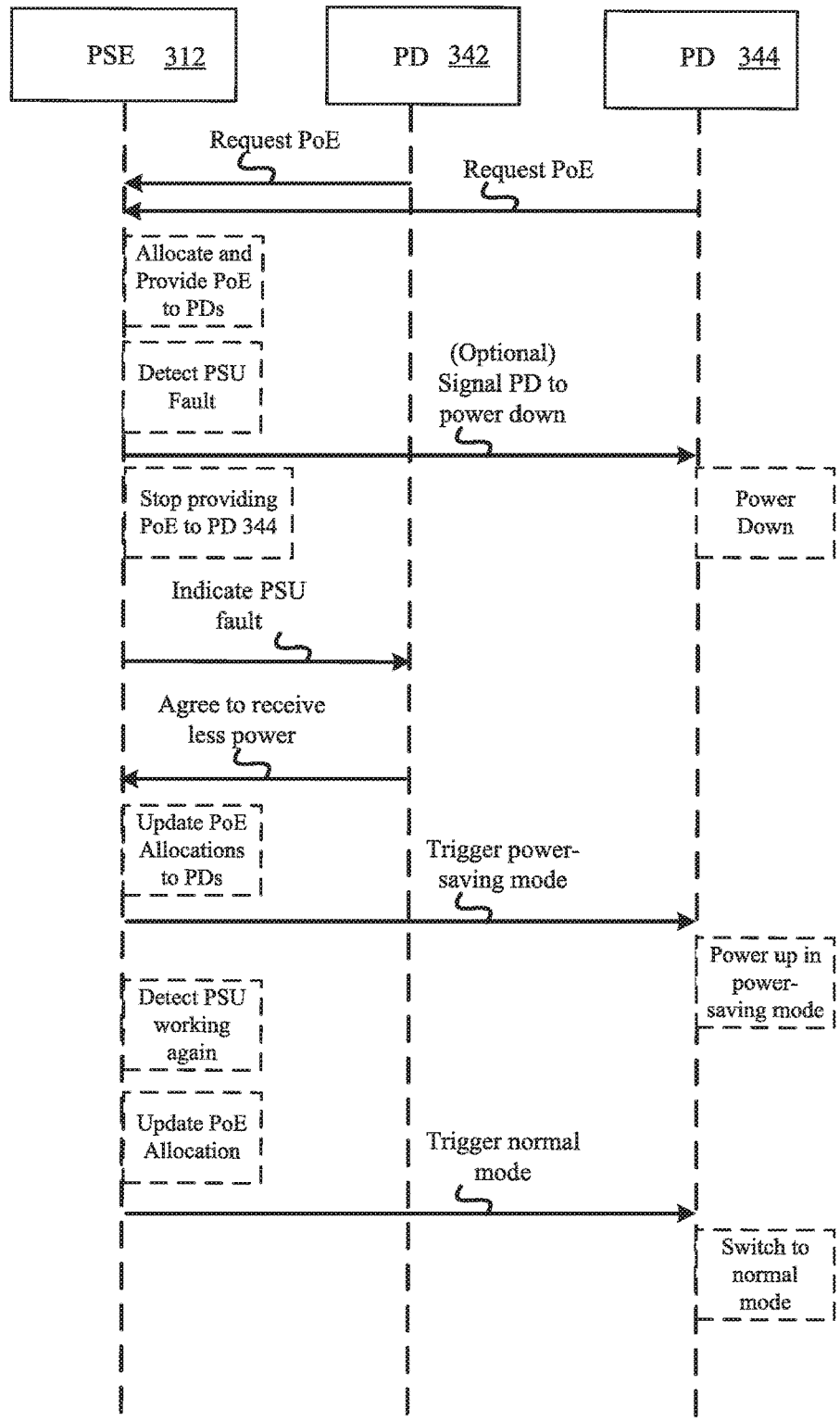
FIG. 3 provides a signal diagram illustrating an example series of communications and actions that may take place in the systems described herein, according to one example.

FIG. 3 provides a signal diagram 300 illustrating an example series of communications and actions that may take place in the systems described herein, according to one example.

Initially, a PD 342 and a PD 344 are connected to the PSE 312 via Ethernet cables. As shown, the PD 342 sends a network communication to the PSE 320 to request that the PSE 320 provide an initial amount power to the PD 342 via Ethernet. Similarly, the PD 344 also sends a network communication to the PSE 320 to request that the PSE 320 provide PoE to the PSE 344.

In response, the PSE 320 commences providing PoE to the PD 342 and the PD 344. Specifically, the PSE 320 allocates the initial amount of power to the PD 342 and provides up to the initial amount of power to the PD 342 via Ethernet. Similarly, the PSE 320 allocates the amount of power requested by the PD 344 to the PD 344 and provides up to amount of power requested by the PD 344 to the PD 344 the via Ethernet.

At some point after the PSE 320 commences providing PoE to the PD 342 and the PD 344, the PSE 320 detects that a PSU that was providing power to the PSE 320 has experienced a fault and, as a result, can no longer be relied upon to provide power to the PSE 320. Although an additional PSU continues to provide power to the PSE 320, the PSE 320 can no longer provide power to both the PD 342 and the PD 344. Therefore, the PSE 320, upon verifying that a port though which the PD 342 is connected to the PSE 320 is assigned a higher priority level than the priority level assigned to a port through which the PD 344 is connected to the PSE 320, ceases to provide PoE to the PD 342. Optionally, the PSE 320 may send a network communication to the PD 344 to instruct the PD 344 to power down. However, the PSE 320 may also cease to provide PoE to the PD 344 without instructing the PD 344 to power down (e.g., if the PSE 320 determines that the amount of PoE being provided should be reduced immediately without waiting for the PD 344 to shut down). In either case, the PSE 320 reduces the amount of power allocated to the PD 344 to zero Watts.

After ceasing to provide PoE to the PD 344, the PSE 320 sends a network communication to the PD 342 (e.g., using the TLV described above with respect to FIG. 1) indicating that a PSU fault has occurred and requesting that the PD 342 switch into a power-saving mode and accept a lower amount of PoE than the initial amount of power allocated to the PD 342. In response, the PD 342 sends a network communication to the PSE 320 indicating whether the PD 342 agrees to switch into the power-saving mode. If the PD 342 agrees to switch into the power-saving mode, the PSE 320 reduces the amount of power allocated to the PD 342 to a level below an amount that the PD 342 would be expected to consume while in a normal operating mode. If the PD 342 does not agree to switch into the power-saving mode, the PSE 320 instead reduces the amount of power allocated to the PD 342 to a level that is more than the amount that the PD 342 is expected to consume while in the normal operating mode, but is also less than the initial amount of power allocated to the PD 342. This allows the PD 342 to continue operating in the normal mode, but reduces the difference between amount of power that is allocated to the PD 342 and the amount of power that the PD 342 is expected to consume while operating in the normal mode.

Once the amount of power allocated to the PD 342 is reduced, the PSE 320 increases the amount of power allocated to the PD 344 from zero to an amount that is at least sufficient to allow the PD 344 to operate in a power-saving mode, but is no greater than the amount by which the amount of power allocated to the PD 342 was reduced. After increasing the amount of power allocated to the PD 344 in this fashion, the PSE 320 signals the PD 344 to resume operating in the power-saving mode (or in a normal operating mode, if the increase in power allocated to the PD 344 is sufficient). Upon receiving PoE from the PSE 320 again, the PD 344 resumes operating (e.g., in the power-saving mode).

After the amount of power allocated to the PD 342 has been reduced and some of the power saved by the reduction has been re-allocated to the PD 344, the PSE 320 may detect that the PSU that experienced the fault is functioning properly again (e.g., due to being repaired or replaced). As a result, the PSE 320 may update the amount of power allocated to the PD 342 to match the initial amount of power that was allocated to the PD 342 before the PSU failure and provide PoE to the PD 342 accordingly. Similarly, the PSE may update the amount of power allocated to the PD 344 to match the amount of power that the PD 344 requested before the PSU failure, send a communication to the PD 344 indicating that the PD 344 can resume operating in a normal mode, and provide PoE to the PD 344 accordingly. In response, the PD 344 transitions from the power-saving mode into the normal mode.

Figure 4:
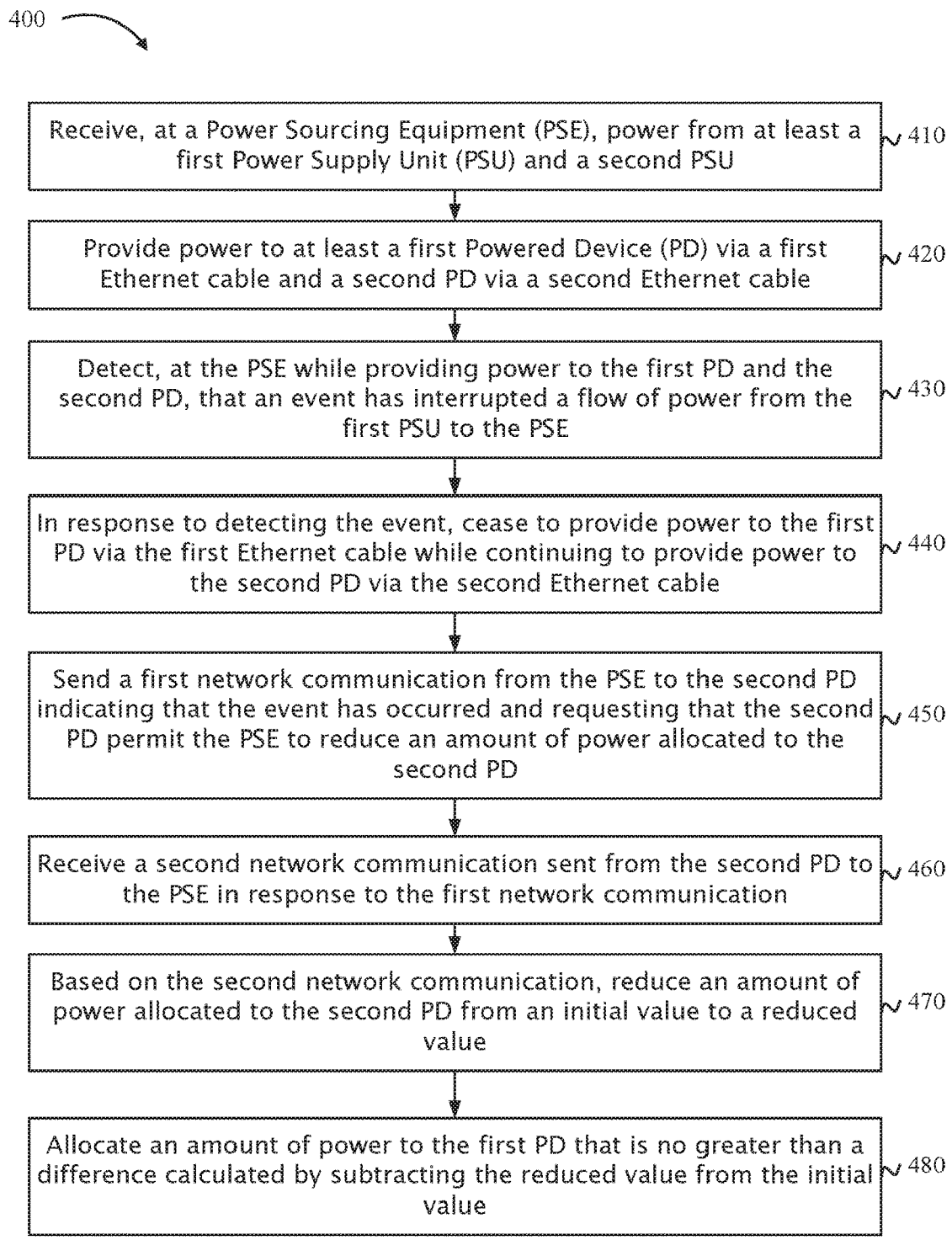
FIG. 4 illustrates functionality for a PSE as described herein, according to one example.

FIG. 4 illustrates functionality 400 for a PSE as described herein, according to one example. The functionality 400 may be implemented as a method or can be executed as instructions on a machine (e.g., by one or more processors), where the instructions are included on at least one computer-readable storage medium (e.g., a transitory or non-transitory computer-readable storage medium). While only eight blocks are shown in the functionality 400, the functionality 400 may include other actions described herein. Also, some of the blocks shown in the functionality 400 may be omitted or reordered without departing from the spirit and scope of this disclosure.

As shown in block 410, the functionality 400 includes receiving, at a Power Sourcing Equipment (PSE), power from at least a first Power Supply Unit (PSU) and a second PSU.

As shown in block 420, the functionality 400 includes providing power to at least a first Powered Device (PD) via a first Ethernet cable and a second PD via a second Ethernet cable.

As shown in block 430, the functionality 400 includes detecting, at the PSE while providing power to the first PD and the second PD, that an event has interrupted a flow of power from the first PSU to the PSE.

As shown in block 440, the functionality 400 includes, in response to detecting the event, ceasing to provide power to the first PD via the first Ethernet cable while continuing to provide power to the second PD via the second Ethernet cable.

As shown in block 450, the functionality 400 includes sending a first network communication from the PSE to the second PD indicating that the event has occurred and requesting that the second PD permit the PSE to reduce an amount of power allocated to the second PD. The first network communication may comprise a bit that indicates the event by specifying a fault status of the first PSU.

As shown in block 460, the functionality 400 includes receiving a second network communication sent from the second PD to the PSE in response to the first network communication. The second network communication may comprise one or more bits that indicate whether the second PD is willing to switch to a power-saving mode. In addition, the second network communication may comprise a plurality of bits that indicate how much power the second PD has to receive in order to operate in a power-saving mode. Furthermore, the second network communication may comprise a plurality of bits that indicate an average amount of power that the second PD is expected to consume while operating in a normal mode.

As shown in block 470, the functionality 400 includes, based on the second network communication, reducing an amount of power allocated to the second PD from an initial value to a reduced value.

As shown in block 480, the functionality 400 includes allocating an amount of power to the first PD that is no greater than a difference calculated by subtracting the reduced value from the initial value.

The functionality 400 may further comprise determining the amount of power allocated to the first PD is insufficient to power the first PD in a power-saving mode; sending a third network communication from the PSE to a third PD that continues to receive power from the PSE via a third Ethernet cable after the event, the third network communication indicating that the event has occurred and requesting that the third PD permit the PSE to reduce an amount of power allocated to the third PD; receiving a fourth network communication sent from the third PD to the PSE in response to the third network communication; based on the fourth network communication, reducing an amount of power allocated to the third PD from an additional initial value to an additional reduced value; and allocating an additional amount of power to the first PD that is no greater than an additional difference calculated by subtracting the additional reduced value from the additional initial value.

The functionality 400 may further comprise detecting that the event has been resolved such that the flow of power from the first PSU to the PSE has resumed; increasing the amount of power allocated to the second PD from the reduced value back to the initial value; and increasing the amount of power allocated to the first PD to a value that is sufficient to power the first PD in a normal operating mode.

Figure 5:
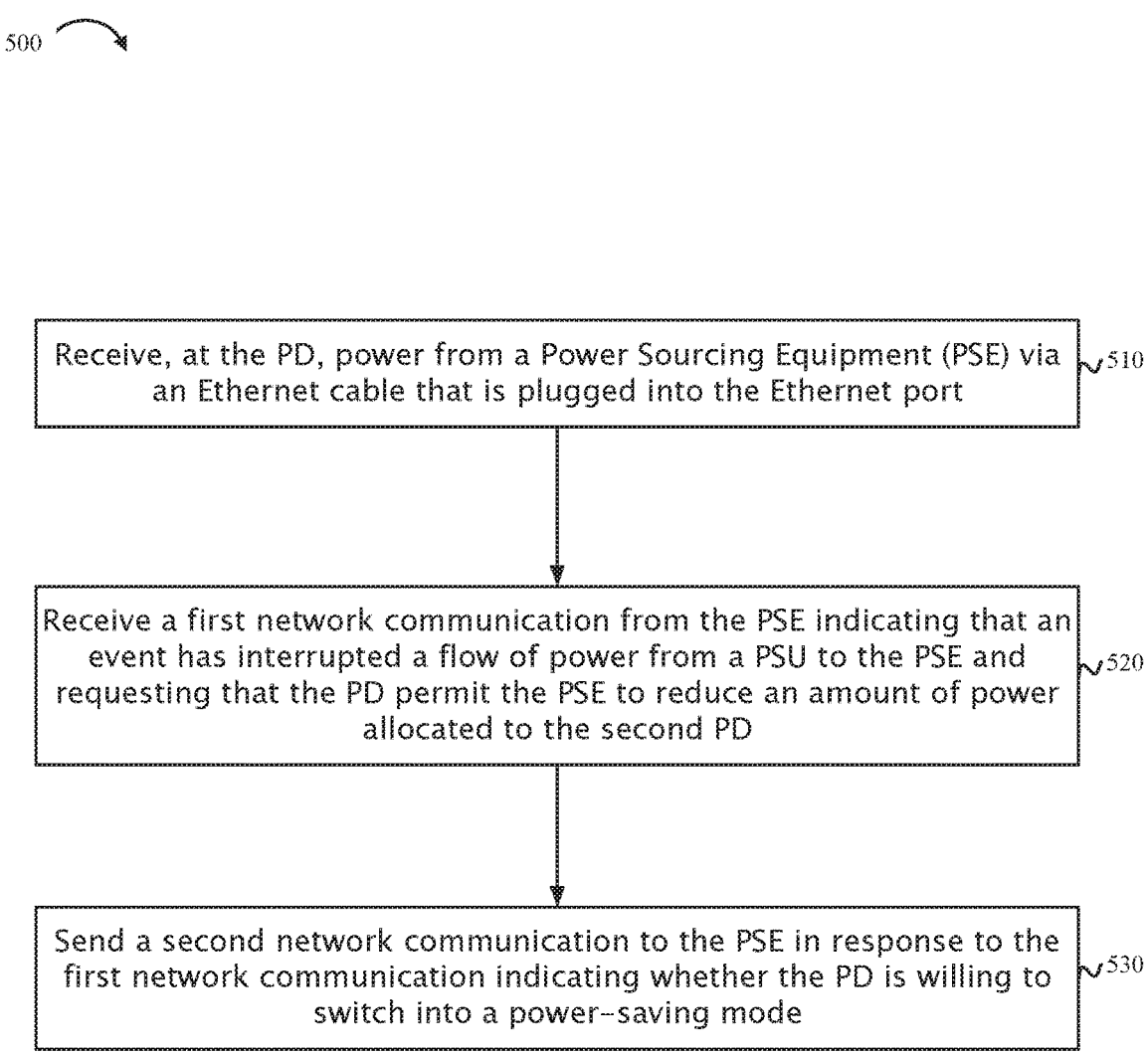
FIG. 5 illustrates functionality for a PD as described herein, according to one example.

FIG. 5 illustrates functionality 500 for a PD as described herein, according to one example. The functionality 500 may be implemented as a method or can be executed as instructions on a machine (e.g., by one or more processors), where the instructions are included on at least one computer-readable storage medium (e.g., a transitory or non-transitory computer-readable storage medium). While only three blocks are shown in the functionality 500, the functionality 500 may include other actions described herein. Also, some of the blocks shown in the functionality 500 may be omitted ore reordered without departing from the spirit and scope of this disclosure.

As shown in block 510, the functionality 500 includes receiving, at the PD, power from a Power Sourcing Equipment (PSE) via an Ethernet cable that is plugged into the Ethernet port.

As shown in block 520, the functionality 500 includes receiving a first network communication from the PSE indicating that an event has interrupted a flow of power from a PSU to the PSE and requesting that the PD permit the PSE to reduce an amount of power allocated to the second PD. The first network communication may comprise a bit that indicates the event by specifying a fault status of the PSU.

As shown in block 530, the functionality 500 includes sending a second network communication to the PSE in response to the first network communication indicating whether the PD is willing to switch into a power-saving mode.

The functionality 500 may also include switching from a normal mode to the power-saving mode. The second network communication may comprise one or more bits indicating that the PD is willing to switch to the power-saving mode. In addition, the second network communication may comprise a plurality of bits that indicate how much power the PD has to receive in order to operate in the power-saving mode.

Furthermore, the second network communication may comprise a plurality of bits that indicate an average amount of power that the PD is expected to consume while operating in a normal mode.

While the present techniques may be susceptible to various modifications and alternative forms, the embodiments discussed above have been provided only as examples. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method comprising:
   receiving, at a Power Sourcing Equipment (PSE), power from at least a first Power Supply Unit (PSU) and a second PSU;
   providing power to at least a first Powered Device (PD) via a first Ethernet cable and a second PD via a second Ethernet cable;
   detecting, by processing circuitry in the PSE, while providing power to the first PD and the second PD, an interruption to a flow of power from the first PSU to the PSE; and
   in response to detecting the interruption:
      ceasing to provide power to the first PD via the first Ethernet cable while continuing to provide power to the second PD via the second Ethernet cable;
      sending a first network communication from the PSE to the second PD indicating that the interruption has occurred and requesting that the second PD enter a power-saving mode of the second PD;
      receiving a second network communication sent from the second PD to the PSE in response to the first network communication, the second network communication indicating whether the second PD is willing to enter the power-saving mode of the second PD;
      based on the second network communication, reducing an amount of power allocated to the second PD from an initial value to a reduced value;
      allocating an amount of power to the first PD that is based on a difference between the initial value and the reduced value; and
      instructing the first PD to power on in a power-saving mode of the first PD.

2. The method of claim 1, wherein the first network communication comprises a link-layer discovery protocol communication comprising a PSE power status field and a bit in the PSE power status field that indicates the interruption by specifying a fault status of the first PSU.

3. The method of claim 1, wherein the second network communication comprises a link-layer discovery protocol communication comprising a PD power status field and one or more bits in the PD power status field that indicate whether the second PD is willing to switch to the power-saving mode of the second PD.

4. The method of claim 3, wherein the PD power status field further comprises a plurality of bits that indicate how much power the second PD has to receive in order to operate in the power-saving mode of the second PD.

5. The method of claim 3, wherein the PD power status field further comprises a plurality of bits that indicate an expected amount of power that the second PD is expected to consume while operating in a normal mode.

6. The method of claim 1, further comprising:
   determining the amount of power allocated to the first PD is insufficient to power the first PD in the power-saving mode of the first PD;
   sending a third network communication from the PSE to a third PD that continues to receive power from the PSE via a third Ethernet cable after the interruption, the third network communication indicating that the interruption has occurred and requesting that the third PD enter a power-saving mode of the third PD;
   receiving a fourth network communication sent from the third PD to the PSE in response to the third network communication, the fourth network communication indicating whether the third PD is willing to enter the power-saving mode of the third PD;
   based on the fourth network communication, reducing an amount of power allocated to the third PD from an additional initial value to an additional reduced value; and
   allocating an additional amount of power to the first PD that is based on a difference between the additional initial value and the additional reduced value.

7. The method of claim 1, further comprising:
   detecting that the interruption has been resolved such that the flow of power from the first PSU to the PSE has resumed;
   increasing the amount of power allocated to the second PD from the reduced value back to the initial value; and increasing the amount of power allocated to the first PD to a value that is sufficient to power the first PD in a normal operating mode of the first PD.

8. The method of claim 1, further comprising, in response to the second communication indicating that the second PD is willing to enter the power-saving mode of the second PD, setting the reduced value based on a power-saving mode consumption amount corresponding to an amount of power the second PD is expected to consume in the power-saving mode of the second PD.

9. The method of claim 1, wherein the second communication further indicates a normal mode consumption amount corresponding to an amount of power the second PD is expected to consume while operating in a normal mode of the second PD and the method further comprises, in response to the second communication indicating that the second PD is not willing to enter the power-saving mode of the second PD, setting the reduced value to equal the normal mode consumption amount plus a defined offset.

10. A Power Sourcing Equipment (PSE) comprising:
one or more processors;
a first Ethernet port;
a second Ethernet port; and
a memory storing instructions that, when executed on the one or more processors, cause the PSE to:
receive, at the PSE, power from at least a first Power Supply Unit (PSU) and a second PSU;
provide power to at least a first Powered Device (PD) via a first Ethernet cable plugged into the first Ethernet port and a second PD via a second Ethernet cable plugged into the second Ethernet port;
detect, by the one or more processors in the PSE while providing power to the first PD and the second PD, an interruption in a flow of power from the first PSU to the PSE; and
in response to detecting the interruption:
cease to provide power to the first PD via the first Ethernet cable while continuing to provide power to the second PD via the second Ethernet cable;
send a first network communication from the PSE to the second PD indicating that the interruption has occurred and requesting that the second PD enter a power-saving mode of the second PD;
receive a second network communication sent from the second PD to the PSE in response to the first network communication, the second network communication indicating whether the second PD is willing to enter the power-saving mode of the second PD;
based on the second network communication, reduce an amount of power allocated to the second PD from an initial value to a reduced value;
allocate an amount of power to the first PD that is based on a difference between the initial value and the reduced value; and
instruct the first PD to power on in a power-saving mode of the first PD.

11. The PSE of claim 10, wherein the first network communication a link-layer discovery protocol communication comprising a PSE power status field and a bit in the PSE power status field that indicates the interruption by specifying a fault status of the first PSU.

12. The PSE of claim 10, wherein the second network communication comprises a link-layer discovery protocol communication comprising a PD power status field and one or more bits in the PD power status field that indicate whether the second PD is willing to switch to the power-saving mode of the second PD.

13. The PSE of claim 12, wherein the PD power status field further comprises a plurality of bits that indicate how much power the second PD has to receive in order to operate in the power-saving mode of the second PD.

14. The PSE of claim 12, wherein the PD power status field further comprises a plurality of bits that indicate an expected amount of power that the second PD is expected to consume while operating in a normal mode of the second PD.

15. The PSE of claim 10, wherein the instructions cause the PSE to:
in response to the second communication indicating that the second PD is willing to enter the power-saving mode of the second PD, set the reduced value based on a power-saving mode consumption associated with the power-saving mode of the second PD; and
in response to the second communication indicating that the second PD is not willing to enter the power-saving mode of the second PD, set the reduced value based on a normal mode consumption amount associated with a normal mode of the second PD.

16. The PSE of claim 15, wherein the second communication indicates the normal mode consumption amount which corresponds to an amount of power the second PD is expected to consume in the normal mode of the second PD and setting the reduced value based on the normal mode consumption amount comprises setting the reduced value to equal the normal mode consumption amount plus a defined offset.

17. A powered device (PD) comprising:
one or more processors;
an Ethernet port; and
a memory storing instructions that, when executed on the one or more processors, cause the PD to:
receive, at the PD, power from a Power Sourcing Equipment (PSE) via an Ethernet cable that is plugged into the Ethernet port;
receive a first network communication from the PSE indicating an interruption in a flow of power from a PSU to the PSE and requesting that the PD enter a power-saving mode;
in response to the first network communication, determine by the one or more processors whether to switch into the power-saving mode and send a second network communication to the PSE;
in response to determining to enter the power-saving mode, cause the second network communication to indicate that the PD is willing to switch to the power-saving mode, and enter the power-saving mode; and
in response to determining not to enter the power-saving mode, cause the second network communication to indicate that the PD is not willing to switch to the power-saving mode, and remain in a normal mode.

18. The PD of claim 17, wherein the second network communication comprises a link-layer discovery protocol communication comprising a PD power status field and one or more bits indicating whether the PD is willing to switch to the power-saving mode.

19. The PD of claim 18, wherein the PD power status field further comprises a plurality of bits that indicate how much power the PD has to receive in order to operate in the power-saving mode.

20. The PD of claim 18, wherein the PD power status field further comprises a plurality of bits that indicate an expected amount of power that the PD is expected to consume while operating in a normal mode.

* * * * *